United States Patent
McTavish et al.

(10) Patent No.: US 6,683,247 B1
(45) Date of Patent: Jan. 27, 2004

(54) HANDHOLE COVER

(75) Inventors: Gordon John McTavish, Sherwood Park (CA); Steven Joseph Koski, Edmonton (CA); Cory John Koski, Edmonton (CA)

(73) Assignee: Drader Manufacturing Industries Ltd., Edmonton (CA)

( * ) Notice: Subject to any disclaimer, the term of this patent is extended or adjusted under 35 U.S.C. 154(b) by 0 days.

(21) Appl. No.: 10/227,473

(22) Filed: Aug. 23, 2002

(51) Int. Cl.⁷ .................................................. H02G 7/20
(52) U.S. Cl. ..................... 174/45 R; 220/3.8; 220/313; 138/92; 174/66
(58) Field of Search ................... 174/45 R, 38, 174/66, 71 R, 40 R, 5 R; 220/3.8, 213, 315, 241; 138/92; D13/177, 152; D23/318

(56) References Cited

U.S. PATENT DOCUMENTS

| | | | | |
|---|---|---|---|---|
| 291,771 A | * | 1/1884 | Rasgorshek | 220/246 |
| 3,343,322 A | * | 9/1967 | Lurkls et al. | 52/298 |
| 3,624,269 A | | 11/1971 | Latta | 174/45 R |
| 3,808,504 A | | 4/1974 | Rabie | 317/99 |
| 4,187,418 A | * | 2/1980 | Harris | 174/45 R |
| 4,914,258 A | | 4/1990 | Jackson | 174/45 R |
| 5,255,810 A | | 10/1993 | Hosford | 220/243 |
| 5,266,738 A | | 11/1993 | MacVoy | 174/45 R |
| 5,483,019 A | * | 1/1996 | Tourigny | 174/45 R |
| 5,524,411 A | | 6/1996 | Crossman | 52/736.1 |
| 5,550,708 A | | 8/1996 | Siems | 361/642 |
| 5,641,939 A | | 6/1997 | Tourigny | 174/45 R |
| 5,820,255 A | | 10/1998 | Carrington et al. | 362/431 |
| 6,089,396 A | | 7/2000 | Pozek | 220/251 |
| 6,118,074 A | | 9/2000 | Turcovsky et al. | 174/66 |
| D436,081 S | | 1/2001 | Jackson | D13/152 |
| 6,204,446 B1 | | 3/2001 | Parduhn | 174/45 R |

* cited by examiner

Primary Examiner—Dhiru R Patel
(74) Attorney, Agent, or Firm—Christensen O'Connor Johnson Kindness PLLC

(57) ABSTRACT

A handhole cover includes a body adapted to cover a handhole. The body has a front surface, a rear surface, and a peripheral edge. Engagement members protrude rearwardly and outwardly from the rear surface adjacent to the peripheral edge. The engagement members are adapted to engage a peripheral edge of the handhole and are spaced about the peripheral edge to provide a secure engagement of the body in the handhole. At least one of the engagement members is a rotatable locking member having a helical engagement surface. The rotatable locking member is selectively rotated between a locking position and a release position.

10 Claims, 8 Drawing Sheets

HANDHOLE COVER

FIELD OF THE INVENTION

The present invention relates to a handhole cover and, in particular, a handhole cover suitable for use with utility poles.

BACKGROUND OF THE INVENTION

Utility poles are, generally, manufactured with a handhole. The handhole provides a means of access to electrical wiring of the utility pole by service personnel. The handhole is, typically, held in place by screws which engage threaded apertures in the utility pole. As a results of usage over time, these threaded apertures become rusted or otherwise damaged to the point that they are no longer capable of receiving a screw. When this occurs, the cover that came with the utility pole can not be put back into place. It is undesirable to leave the handhole uncovered as the internal workings of the utility power would be prone to tampering by vandals and weather damage due to exposure to the elements. The exposed electrical wires also pose a potential danger, especially to children and small animals. As the infrastructure of utility poles across North America ages, there is a growing market for after market handhole covers that do not require the original threaded apertures in order to be secured in position.

An example of such a handhole cover is U.S. Pat. No. 5,641,939 granted to Tourigny in 1997. The Tourigny reference discloses a handhole cover that has grooves for receiving straps. Straps are positioned in the grooves and surround the utility pole in order to secure the handhole cover in position. External straps are not viewed as the most desirable means for securing handhole covers in position.

SUMMARY OF THE INVENTION

What is required is a replacement handhole cover that can be retrofit onto a utility pole without the use of external straps and, preferably, provide an aesthetically pleasing substitution for the original manufactured handhole cover.

According to the present invention there is provided a handhole cover which includes a body adapted to cover a handhole. The body has a front surface, a rear surface, and a peripheral edge. Engagement members protrude rearwardly and outwardly from the rear surface adjacent to the peripheral edge. The engagement members are adapted to engage a peripheral edge of the handhole and are spaced about the peripheral edge to provide a secure engagement of the body in the handhole. At least one of the engagement members is a rotatable locking member having a helical engagement surface. Means is provided for selectively rotating the rotatable locking member between a locking position and a release position.

The handhole cover, as described above, does not require the original threaded apertures in order to be secured in position. The helical engagement surface engages the peripheral edge of the handhole. The rotatable locking member can then be rotated until it engages the peripheral edge of the handhole to lock the handhole cover in position. The helical engagement surface enables the rotatable locking member to accommodate minor differences in the distance to the peripheral edge between handholes. Due to the helical engagement surface, the handhole cover is drawn into a tight and secure position as the locking member is rotated.

The rotatable locking member with helical engagement surface can be placed in different configurations of handhole covers. As will hereinafter be illustrated and described, a single rotatable locking member can be used in combination with hook-form engagement members. As will hereinafter be illustrated and described, two or three rotatable locking members with helical engagement surfaces can be used.

In order to provide the desired depth, it is preferred that the rotatable locking member be mounted on a support post that protrudes rearwardly from the rear surface of the body. The length of the support post will vary depending upon the depth the application requires.

There are various means than can be used to selectively rotate the rotatable locking member between a locked position and an unlocked position. Beneficial results have been obtained as will be hereinafter illustrated and described when the means for selectively rotating the locking member is a screw having a head with a receptacle for receiving a tool.

Although beneficial results may be obtained through the use of the handhole cover, as described above, security is a consideration. It is desirable that only authorized personnel be able to readily open the handhole cover. What is required is a low cost means for ensuring secure access. Beneficial results have been obtained when the support post is tubular having a central bore. This enables the means for selectively rotating the locking member (such as the screw having a head with a receptacle) to be concealed within the central bore. It has been found that concealing the screw head, and using a unique shaped receptacle provides adequate security and there is no need to resort to more expensive security measures.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
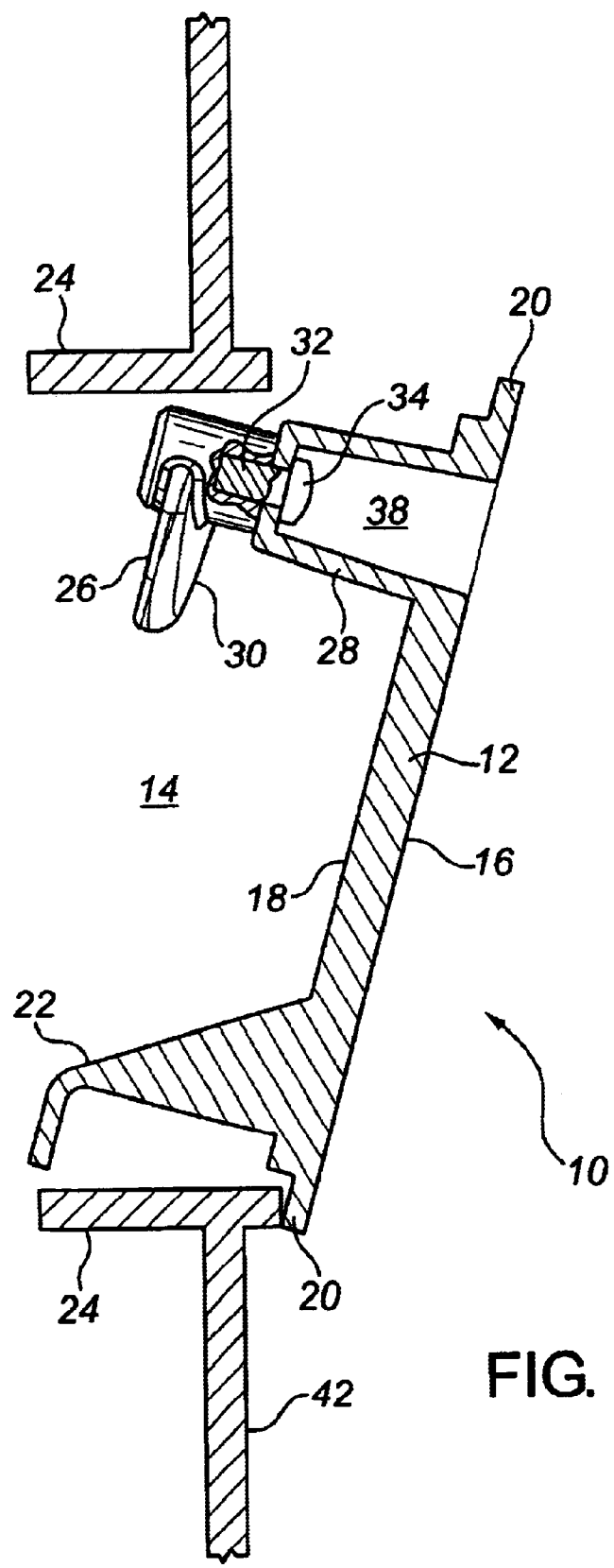
FIG. 1 is a side elevation view, in section, illustrating a first embodiment of handhole cover constructed in accordance with the teachings of the present invention in the process of being inserted into a handhole of a utility pole.

The preferred embodiment, a handhole cover generally identified by reference numeral 10, will now be described with reference to FIGS. 1 through 5.

Figure 2:
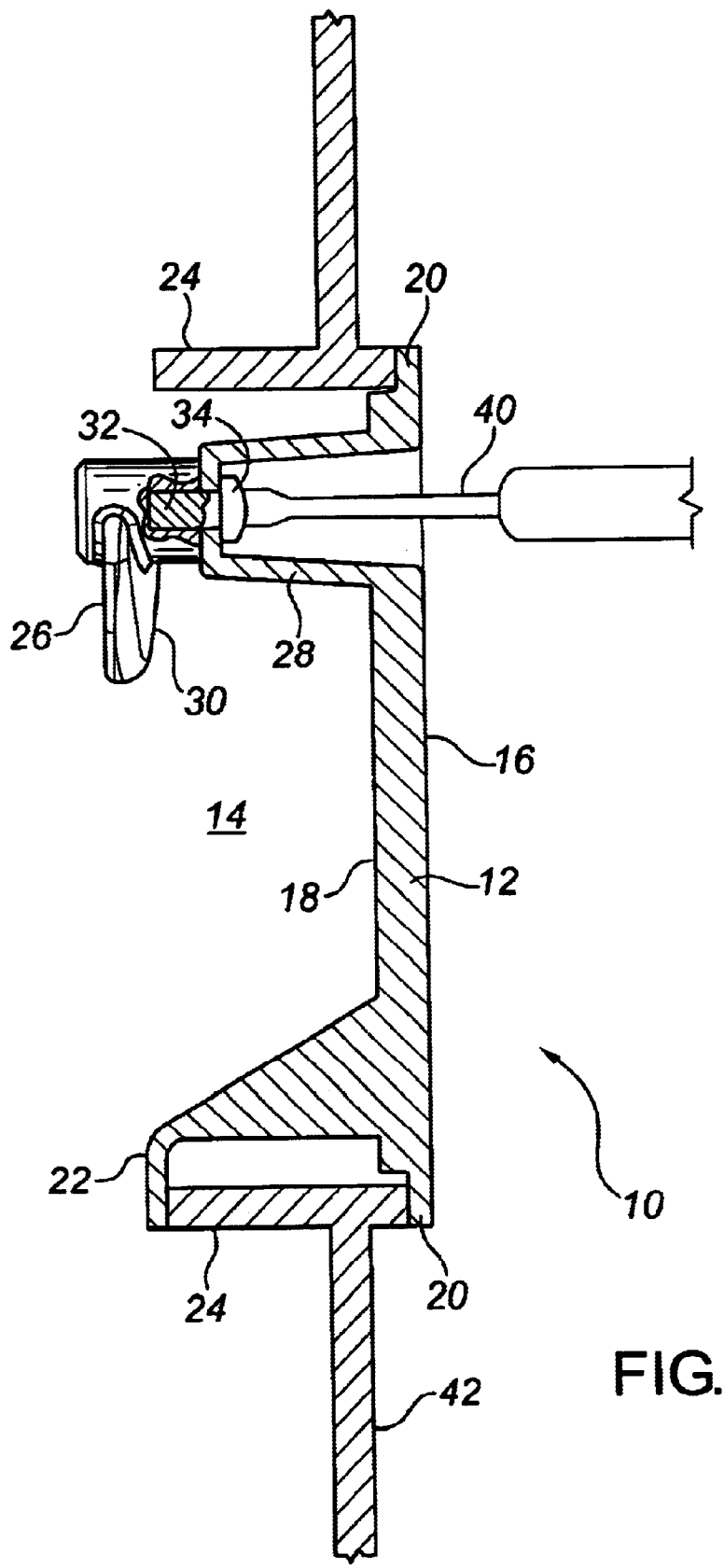
FIG. 2 is a side elevation view, in section, of the first embodiment of handhole cover illustrated in FIG. 1, in position within the handhole and with the locking member in an unlocked position.
Figure 5:
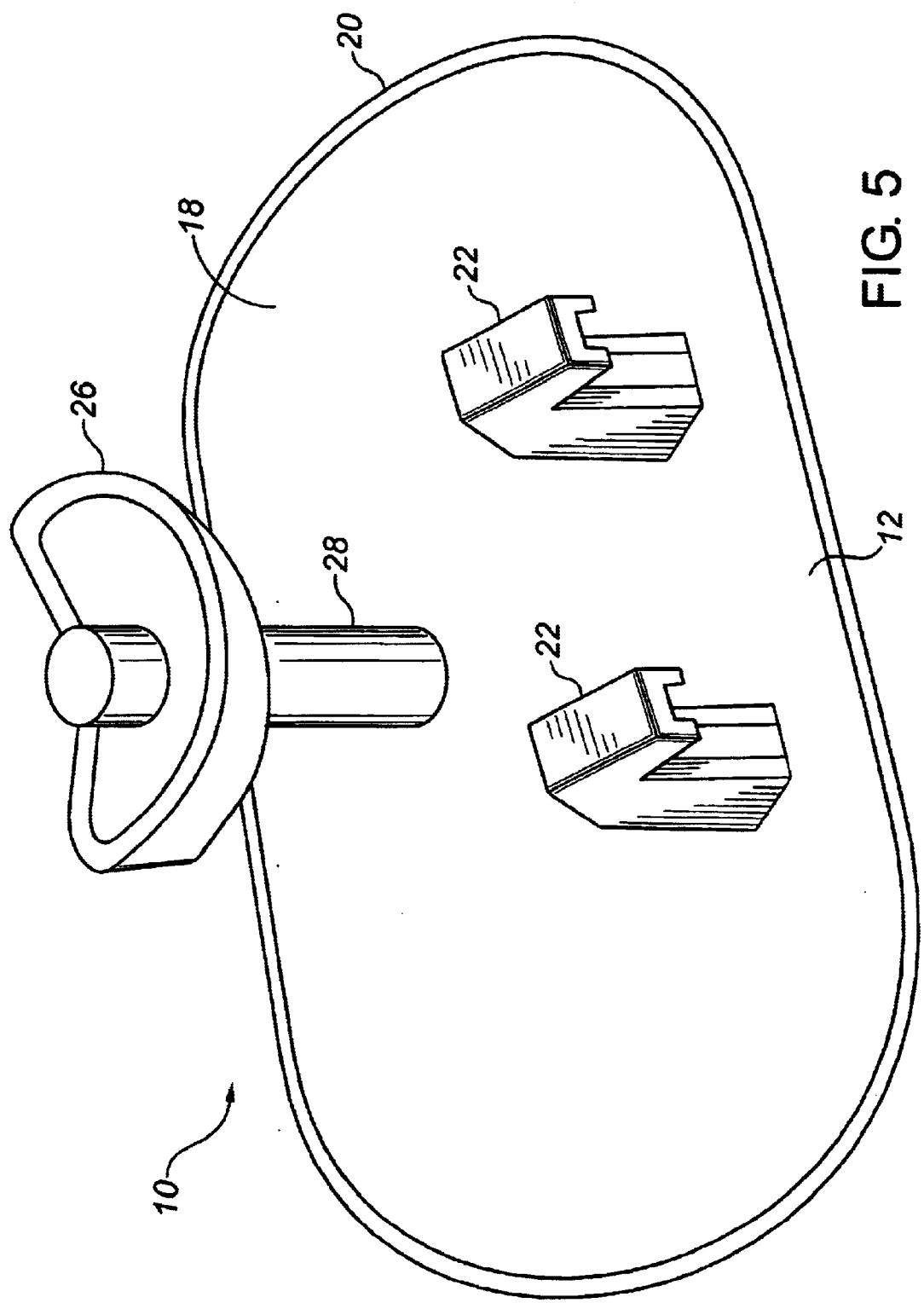
FIG. 5 is a rear perspective view of the first embodiment of handhole cover illustrated in FIG. 1, showing a first configuration of engagement members including one rotatable locking member.

Structure and Relationship of Parts:

Referring to FIG. 1, there is provided a handhole cover 10, which includes a body 12 that is adapted to cover a handhole 14. Body 12 has a front surface 16, a rear surface 18, and a peripheral edge 20. Referring to FIG. 5, two hook-form engagement members 22 protrude rearwardly and outwardly from rear surface 18 adjacent to peripheral edge 20. Referring to FIG. 2, hook-form engagement members 22 are adapted to engage a peripheral edge 24 of handhole 14. While the illustrated embodiment shows two hook-form engagement members 22, it will be appreciated that there could be one or any number of hook-form engagement members 22 on rear surface 18.

Figure 3:
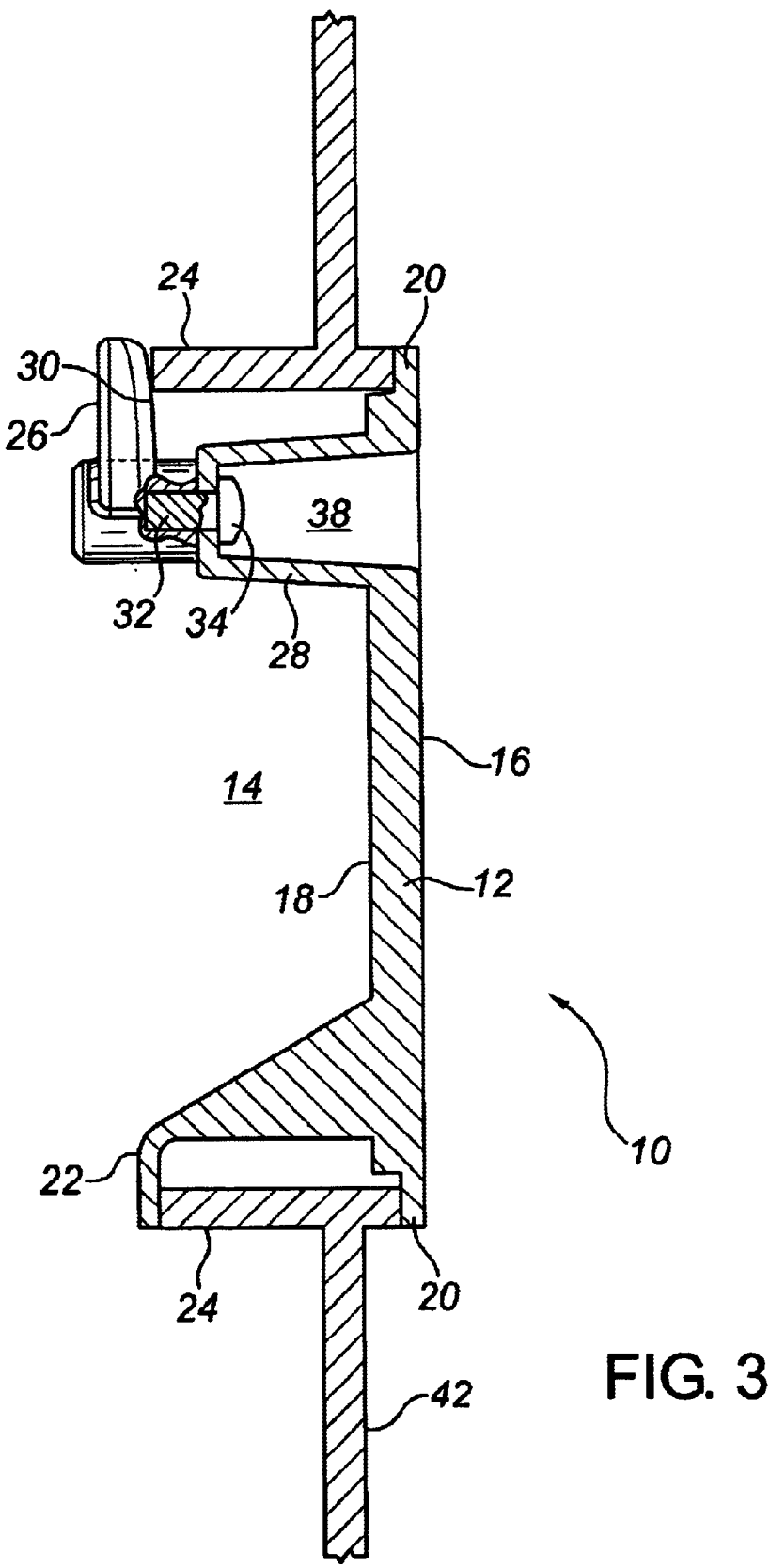
FIG. 3 is a side elevation view, in section, of the first embodiment of handhole cover illustrated in FIG. 1, in position within the handhole and with the locking member in an locked position.
Figure 4:
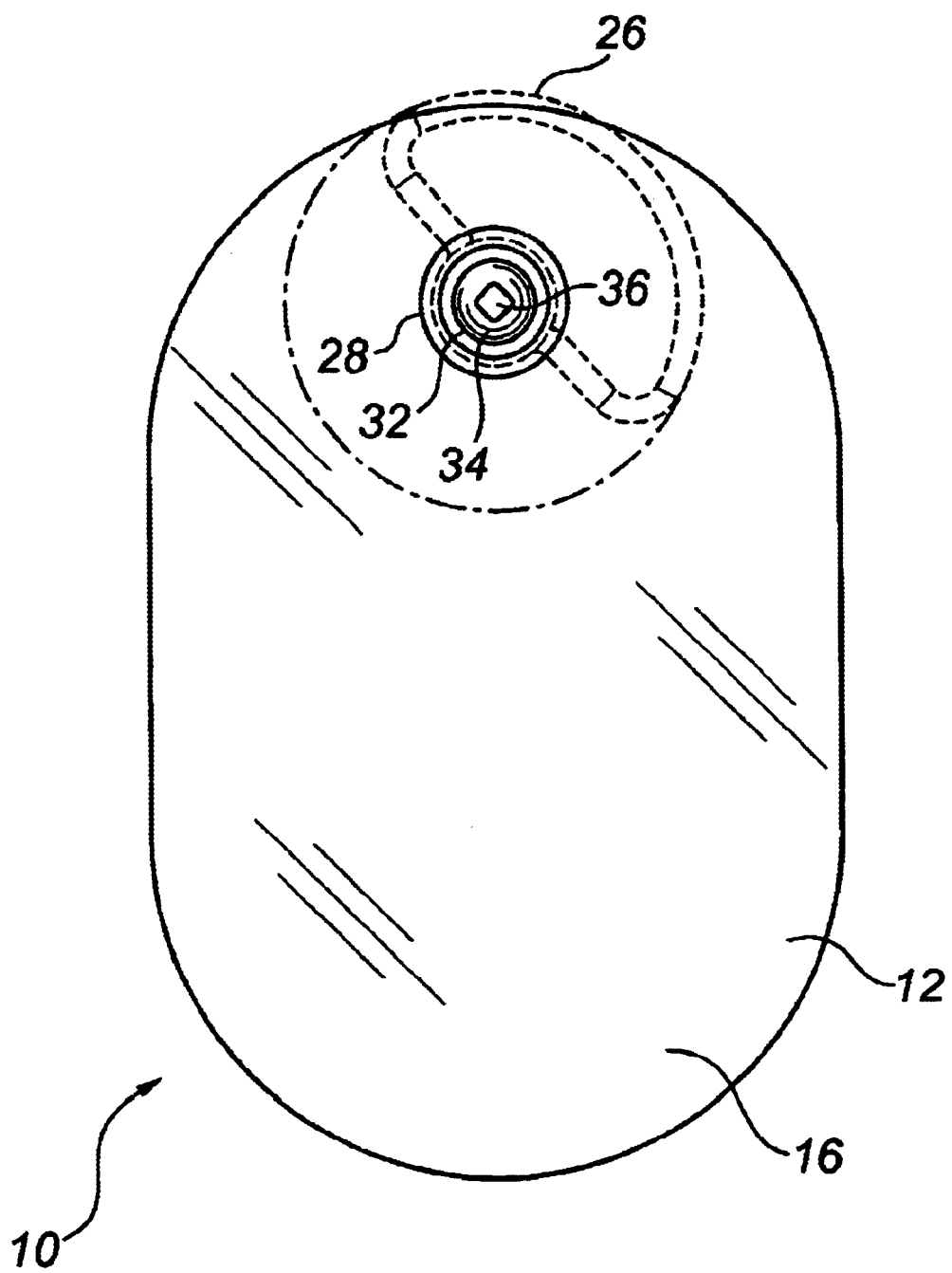
FIG. 4 is a front elevation view of the first embodiment of handhole cover illustrated in FIG. 1, with the locking member in a locked position as illustrated in FIG. 3.

A different form of engagement member in the form of a rotatable locking member 26 is rotatably mounted on a tubular support post 28 that protrudes rearwardly from rear surface 18 adjacent to peripheral edge 20 of body 12 in spaced relation to hook-like engagement members 22. Referring to FIG. 3, rotatable locking member 26 has a helical engagement surface 30. Referring to FIGS. 2 and 4, a screw 32 with a head 34 that has a receptacle 36 for receiving a tool such as a screwdriver 40, provides the means for selectively rotating rotatable locking member 26 between a locking position and a release position. Tubular support post 28 has a central bore 38 within which screw 32 for selectively rotating rotatable locking member 26 is concealed.

Operation

The use and operation of hand hold cover 10 will now be described with reference to FIGS. 1 through 5.

Referring to FIG. 1, in order to secure handhole cover 10 over handhole 14 on a utility pole 42, handhole cover 10 is placed in handhole 14 so that hook-like engagement members 22 engage peripheral edge 24 of handhole 14. Referring to FIGS. 2 and 4, screwdriver 40 can be inserted in central bore 38 of tubular support post 28 to engage receptacle 36 in head 34 of screw 32 and selectively rotate rotatable locking member 26. Referring to FIG. 3, rotatable locking member 26 is rotated until it engages peripheral edge 24 of handhole 14 to lock handhole cover 10 in the locking position. Due to helical engagement surface 30, handhole cover 10 can be drawn into a tight and secure position as rotatable locking member 26 is rotated into the locking position as illustrated in FIG. 3. Helical engagement surface 30 of rotatable locking member 26 enables rotatable locking member 26 to accommodate minor differences in the distance to peripheral edge 24 between handholes 14.

Referring to FIG. 2, should handhole cover 10 be required to be removed to access wiring internal to utility pole 42, rotatable locking member 26 is rotated to the release position illustrated in FIG. 2, and handhole cover 10 can be removed from handhole 14 by disengaging hook-like engagement members 22 from peripheral edge 24 of handhole 14 as illustrated in FIG. 1.

Variations and Alternative Embodiments

The key to the invention is one or more rotatable locking members 26 having helical engagement surface 30. The purpose of this further description is to show some alternative configurations to demonstrate that hook-like engagement members 22 are not essential to the invention.

Figure 7:
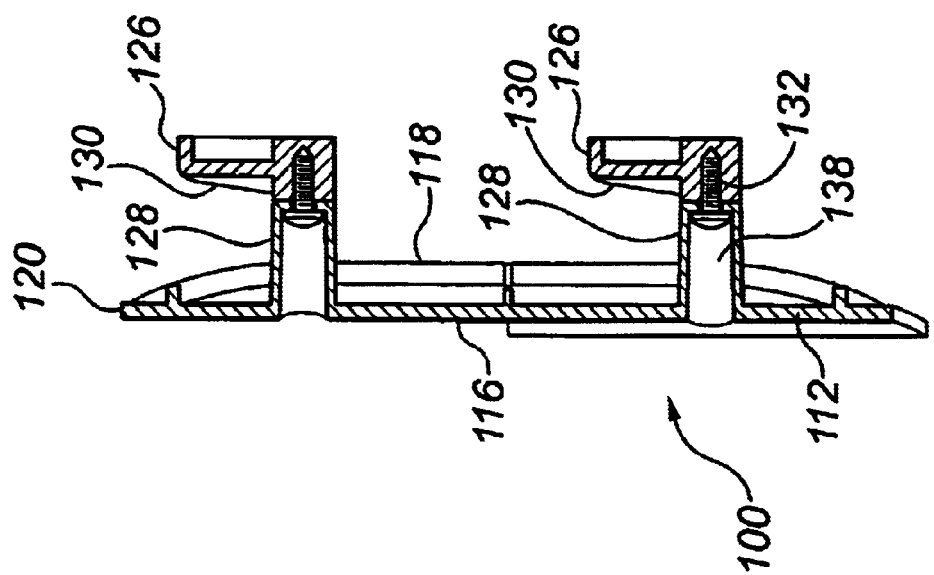
FIG. 7 is a side elevation view, in section, of the second embodiment of handhole cover illustrated in FIG. 6.
Figure 6:
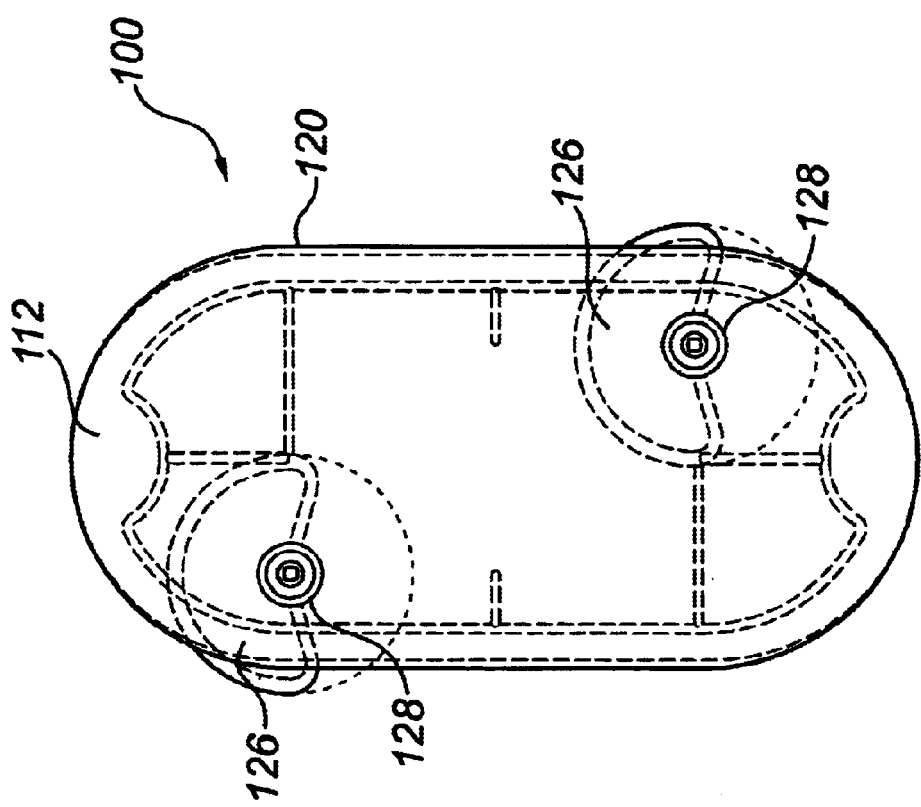
FIG. 6 is a front elevation view of a second embodiment of handhole cover, showing a second configuration of engagement members including two rotatable locking members.

Referring to FIGS. 6 and 7, there is illustrated a second embodiment of handhole cover, generally indicated by reference numeral 100. Handhole cover 100 includes a body 112 which has a front surface 116, a rear surface 118, and a peripheral edge 120. However, in this embodiment the only engagement members are two rotatable locking members 126 which are rotatably mounted on tubular support posts 128. Each of these rotatable locking members 126 have helical engagement surfaces 130. Tubular support posts 128 has a central bore 138 within which a screw 132 for selectively rotating rotatable locking members 126 is concealed.

Figure 8:
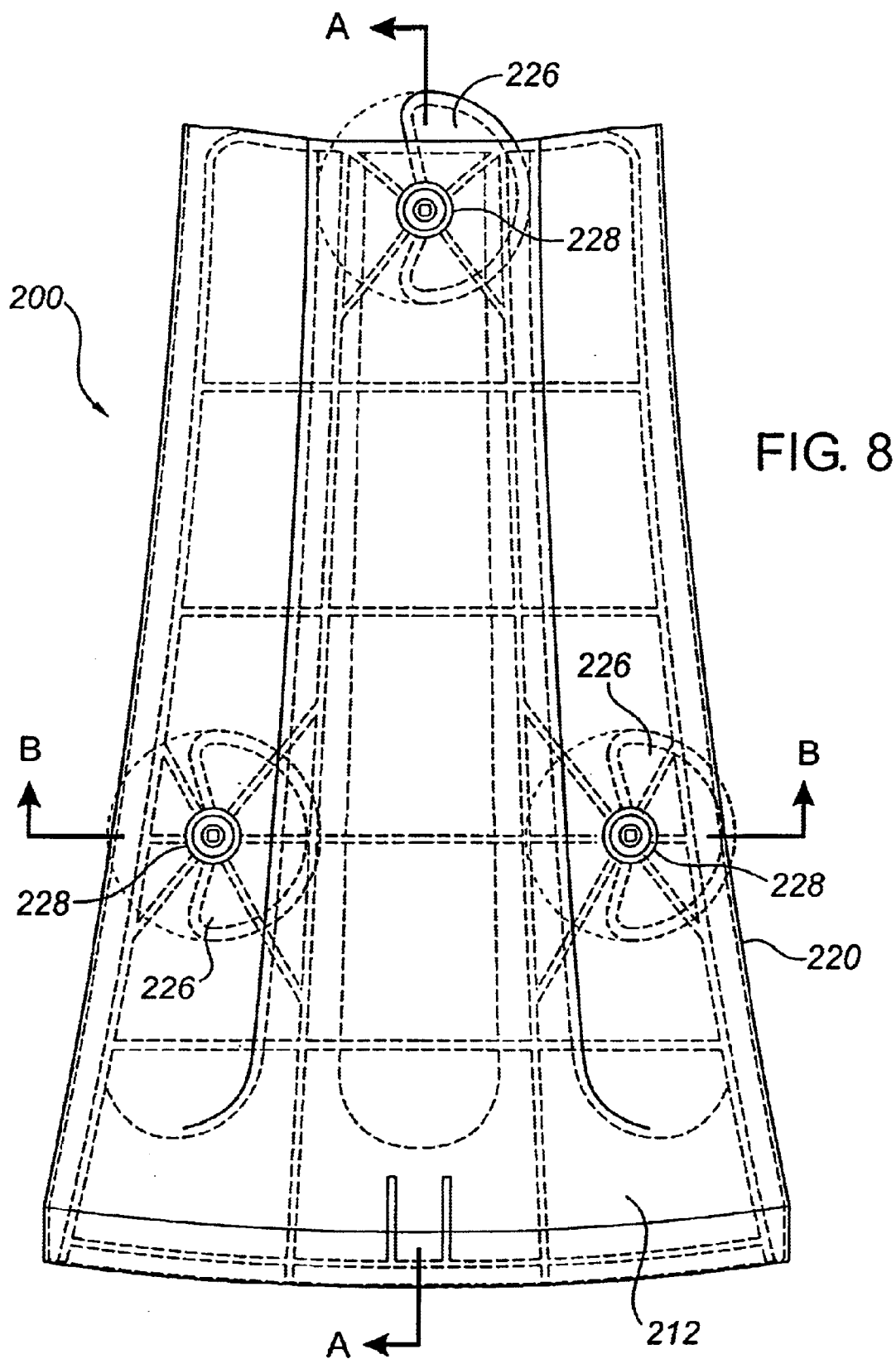
FIG. 8 is a rear elevation view of a third embodiment of handhole cover, showing a third configuration of engagement members including three rotatable locking members.
Figure 9:
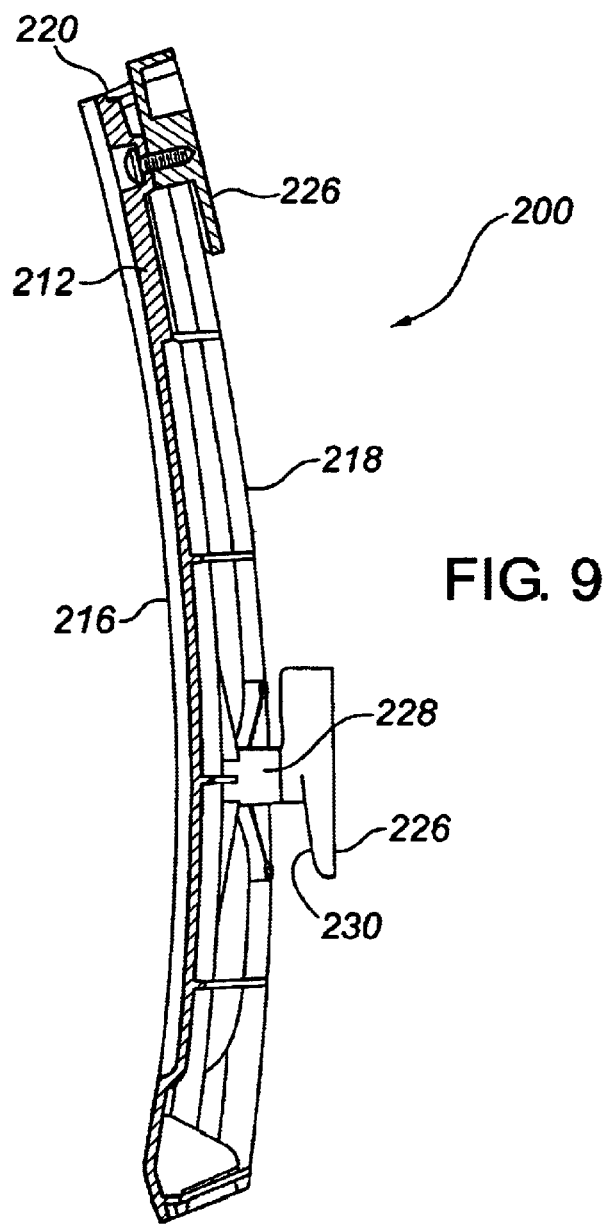
FIG. 9 is a side elevation view, in section, of the third embodiment of the handhole cover taken along section lines A—A of FIG. 8.
Figure 10:
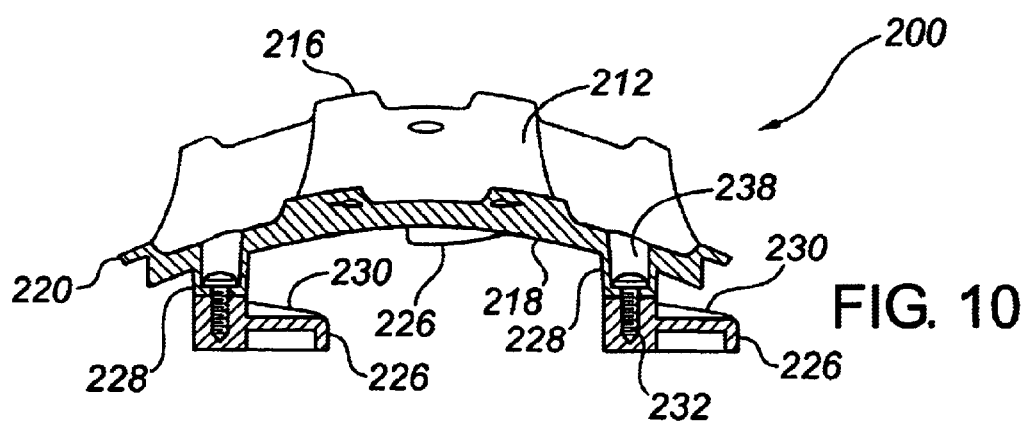
FIG. 10 is a bottom plan view, in section, of the third embodiment of handhole cover taken along section lines B—B of FIG. 8.

Referring to FIGS. 8, 9 and 10, there is illustrated a third embodiment of handhole cover, generally indicated by reference numeral 200. Handhole cover 200 includes a body 212 which has a front surface 216, a rear surface 218, and a peripheral edge 220. However, in this embodiment the only engagement members are three rotatable locking members 226 which are rotatably mounted on tubular support posts 228. Each of these rotatable locking members 226 have helical engagement surfaces 230. Tubular support posts 228 have a central bore 238 within which a screw 232 for selectively rotating rotatable locking members 226 is concealed.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A handhole cover, comprising:
    a body adapted to cover a handhole, the body having a front surface, a rear surface, and a peripheral edge;
    engagement members protruding rearwardly and outwardly from the rear surface adjacent to the peripheral edge, the engagement members being adapted to engage a peripheral edge of the handhole and being spaced about the peripheral edge to provide a secure engagement of the body in the handhole;
    at least one of the engagement members being a rotatable locking member having a helical engagement surface; and
    means for selectively rotating the rotatable locking member between a,locking position and a release position.

2. The handhole cover as defined in claim 1, wherein there are two rotatable locking members with helical engagement surfaces.

3. The handhole cover as defined in claim 1, wherein there are three rotatable locking members with helical engagement surfaces.

4. The handhole cover as defined in claim 1, wherein all of the engagement members are rotatable locking members with helical engagement surfaces.

5. The handhole cover as defined in claim 1, wherein at least one of the engagement members is a hook.

6. The handhole cover as defined in claim 1, wherein the rotatable locking member is mounted on a support post that protrudes rearwardly from the rear surface of the body.

7. The handhole cover as defined in claim 6, wherein the support post is tubular having a central bore and the means for selectively rotating the rotatable locking member is concealed within the central bore.

8. The handhole cover as defined in claim 1, wherein the means for selectively rotating the rotatable locking member is a screw having a head with a receptacle for receiving a tool.

9. A handhole cover, comprising:

a body adapted to cover a handhole, the body having a front surface, a rear surface, and a peripheral edge;

at least one hook-form engagement member protruding rearwardly and outwardly from the rear surface adjacent to the peripheral edge, the hook-form engagement member being adapted to engage a peripheral edge of the handhole;

a rotatable locking member rotatably mounted on a tubular support post that protrudes rearwardly from the rear surface adjacent to the peripheral edge of the body in spaced relation to the at least one hook-form engagement member, the rotatable locking member having a helical engagement surface;

a screw having a head with a receptacle for receiving a tool providing means for selectively rotating the rotatable locking member between a locking position and a release position; and the tubular support post having a central bore, the screw for selectively rotating the rotatable locking member being concealed within the central bore.

10. A handhole cover, comprising:

a body adapted to cover a handhole, the body having a front surface, a rear surface, and a peripheral edge;

engagement members protruding rearwardly and outwardly from the rear surface adjacent to the peripheral edge, the engagement members being adapted to engage a peripheral edge of the handhole and being spaced about the peripheral edge to provide a secure engagement of the body in the handhole;

each of the engagement members being a rotatable locking member rotatably mounted on a tubular support post that protrudes rearwardly from the rear surface adjacent to the peripheral edge of the body, the rotatable locking member having a helical engagement surface;

a screw having a head with a receptacle for receiving a tool providing means for selectively rotating the rotatable locking member between a locking position and a release position; and the tubular support post having a central bore, the screw for selectively rotating the rotatable locking member being concealed within the central bore.

* * * * *

UNITED STATES PATENT AND TRADEMARK OFFICE
CERTIFICATE OF CORRECTION

PATENT NO. : 6,683,247 B1
DATED : January 27, 2004
INVENTOR(S) : G.J. McTavish et al.

It is certified that error appears in the above-identified patent and that said Letters Patent is hereby corrected as shown below:

Column 4,
Line 64, "a,locking" should read -- a locking --

Signed and Sealed this

Twenty-first Day of September, 2004

JON W. DUDAS
*Director of the United States Patent and Trademark Office*